United States Patent [19]
Kim et al.

[11] Patent Number: 5,867,670
[45] Date of Patent: Feb. 2, 1999

[54] SELF-CONTROL TYPE BUS ARBITRATION CIRCUIT AND ARBITRATION METHOD THEREFOR

[75] Inventors: Do-Young Kim; Sang-Joong Kim, both of Daejeon, Rep. of Korea

[73] Assignees: Electronics and Telecommunications Research Institute, Daejeon; Korea Telecom, Seoul, both of Rep. of Korea

[21] Appl. No.: 851,439

[22] Filed: May 5, 1997

[30] Foreign Application Priority Data

Nov. 26, 1996 [KR] Rep. of Korea .................. 1996-57366

[51] Int. Cl.$^6$ ................................... G06F 13/14
[52] U.S. Cl. ........................... 395/293; 395/299; 395/287
[58] Field of Search ..................... 395/293–305, 395/288, 287, 728

[56] References Cited

U.S. PATENT DOCUMENTS

| | | | |
|---|---|---|---|
| 4,439,856 | 3/1984 | Ulug ....................................... | 370/419 |
| 4,916,692 | 4/1990 | Clarke et al. ........................... | 370/451 |
| 5,311,172 | 5/1994 | Sadamori ................................ | 370/448 |
| 5,771,235 | 6/1998 | Tang et al. ............................... | 370/446 |

OTHER PUBLICATIONS

Paulo Monteiro, Augusto Casaca, Serafim Nunes, "Service Multiplexing In An ATM Environment", IST/INESC, Rua Alves Redol, 9, 1000 Lisboa—Portugal, pp. 653–658, No Date.

Praveen Goli, Dan Upp, Suvsish Ghosh and Joseph L. Hammond, "CellBus: A Flexible Architecture for ATM LANs", 7th IEEE Workshop on Local and Metropolitan Area Networks, pp. 239–244, No Date.

*Primary Examiner*—Thomas C. Lee
*Assistant Examiner*—Harold J. Kim
*Attorney, Agent, or Firm*—Jacobson, Price, Holman & Stern, PLLC

[57] ABSTRACT

A self-control type bus arbitration circuit and an arbitration method are disclosed, in which a bus arbiter is not needed, but entities commonly connected to a bus share 3 kinds of information, so that the entities can arbitrate the bus ownership use for themselves, and can occupy the bus in accordance with the priorities without mutual conflicts. Further, in order to solve the problem of the limit in the number of the sharing entities, the entities are made to use a clock information contained in the 3 kinds of information, i.e., the clock, the reference pulse and the in-use signal information, in such a manner that the clock is multiplied by an integer within the entities.

13 Claims, 5 Drawing Sheets

SELF-CONTROL TYPE BUS ARBITRATION CIRCUIT AND ARBITRATION METHOD THEREFOR

BACKGROUND OF THE INVENTION

1. Field of the Invention

The present invention relates to a bus arbitration technique which is the most important part of the conventional cell bus forming technique in which data transmissions are carried out with packets of a certain size. Unlike the conventional bus, the cell bus generally contains the addresses of the transmitter and receiver within the packets, and therefore, a high speed data transmission is possible at 1 to 1 or 1 to N (where N is the number of arbitrary groups or all nodes). Therefore, this technique is applied to multi media ATM terminals, ATM concentrators, and small scale ATM switching systems.

The present invention relates to a self-control type bus arbitration circuit and an arbitration method, in which the bus arbiter of the conventional technique is not required. More specifically, the present invention relates to a self-control type bus arbitration circuit and an arbitration method, in which bus modules (to be called "entities" below) for transmitting the data through parallelly connected buses arbitrate the buses for themselves by utilizing a proper common information, so as to control the access priority of the buses.

2. Description of the Prior Art

In the conventional technique, a plurality of entities which are connected to cell buses first request for a bus ownership to a bus arbiter. The bus arbiter grants the right of use of bus to a particular entity based on a procedure or method. The granted entity uses the bus, and then negates the bus request, while the bus arbiter recovers the bus ownership. Therefore, in the conventional technique, additional signal lines for requesting for a bus use are needed, and the number of entities which can request for bus use is inevitably limited to the number of the signal lines.

For example, in the case where 32-bit data bits are used as the bus request signal, only 32 entities can be connected to the same bus, and a discriminating information for recognizing a bus request cycle is separately needed. Further, the buses are connected to the entities which are assigned with different priorities, and therefore, the priorities have to be arbitrated. Therefore, not only signal lines for requesting for bus uses are needed, but also the priorities of the entities have to be transmitted to the bus arbiter.

That is, the information such as video and audio information which is sensitive to the time delay should be granted a minimum time delay, while the entities which processes less time-sensitive data should be granted lower priorities. Further, in the case where a bus arbiter is separately present, a separate procedure or method for granting the bus ownership has to be necessarily provided.

SUMMARY OF THE INVENTION

The present invention is intended to overcome the above described disadvantages of the conventional techniques.

Therefore it is an object of the present invention to provide a self-control type bus arbitration circuit and an arbitration method, in which a bus arbiter is not needed, but entities commonly connected to a bus share 3 kinds of information, so that the entities can arbitrate the bus ownership for themselves, and can occupy the bus in accordance with the priorities without mutual conflicts. Further, in order to complement the disadvantage of the drop in the efficiency of the bus use, the entities are made to use a clock information contained in the 3 kinds of information, in such a manner that the clock is multiplied by an integer within the entities.

In achieving the above object, the self-control type bus arbitration circuit for transmitting data by utilizing a bus in-use signal showing the in-use of the shared bus, a clock, and a reference pulse according to the present invention includes: a counter for counting clocks simultaneously generated at each reference pulse; a priority setup value arithmetic circuit for generating priority setup values consisting of a numeral sequence including a multiplication value, an addition value and a basic value set up by a user; a comparator for comparing an output of the counter and a priority setup value of the priority setup value generating arithmetic circuit so as to output a same value; an internally processing pulse outputting section for receiving the same output values and the clocks so as to generate an internally processing pulse having a phase same as that of the clock at a same time point; a logic summing device for generating an output upon activation of a feedback internal bus occupation or upon deactivation of a bus in-use signal; a first latch section for outputting an output after latching an output of the logic summing device in accordance with the generated internally processing pulse; a second latch section for outputting an internal bus request signal in accordance with the clock; an internal bus occupation signal outputting section for generating an internal bus occupation signal by receiving outputs of the first and second latch section; and a bus conflict preventing device for outputting a bus in-use signal after temporarily storing the internal bus occupation signal, for preventing conflicts of the buses.

In another aspect of the present invention, the bus arbitration method according to the present invention includes the steps of: making entities judge as to a bus ownership through self-controls by utilizing only bus in-use signals showing under-uses of sharing buses and reference pulses for discriminating clocks and common clocks furnished by a plurality of service modules (entities), and incrementing counting number at each clock upon shifting of the reference pulse by reading one or a plurality of priority setup values during an arbitration of the bus ownership through a self-control, so as to avoid conflicts during occupation of buses by a plurality of the entities (first step); outputting an internally processing pulse having a phase same as that of the clock upon equalization of the priority setup value and the counting value (second step); latching an internal bus request at shifting of the clock, and latching the bus in-use signal at shifting of the internally processing pulse, to activate the bus in-use signal upon finding a non-use of a bus, and to occupy a bus ownership so as to transmit data (third step); and latching the internal bus request at shifting of the clock, and activating the bus in-use signal upon termination of the bus request, so as to terminate the bus request (fourth step).

In the present invention, when the entities control the ownership of the sharing buses through self-controls, same or different priorities are controlled in accordance with a pre-set priority value. Further, the pre-set values for deciding the priorities of the bus occupation are assigned to the sharing buses, in such a manner that the number of the shifting of the clocks between the reference pulses are not overlapped among the entities. Thus an entity having a high priority is allocated with a high setup value, thereby raising its priority for the bus occupation. In deciding the pre-set value, there is used an arithmetic formula in which a basic value, a multiplication value and an addition value are used in such a manner that the basic value is multiplied by the multiplication value, and to this product, the addition value is added. Further, in order to reduce the bus use intervals, the clock is multiplied by a number within the entities, thereby arbitrating the bus ownership.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
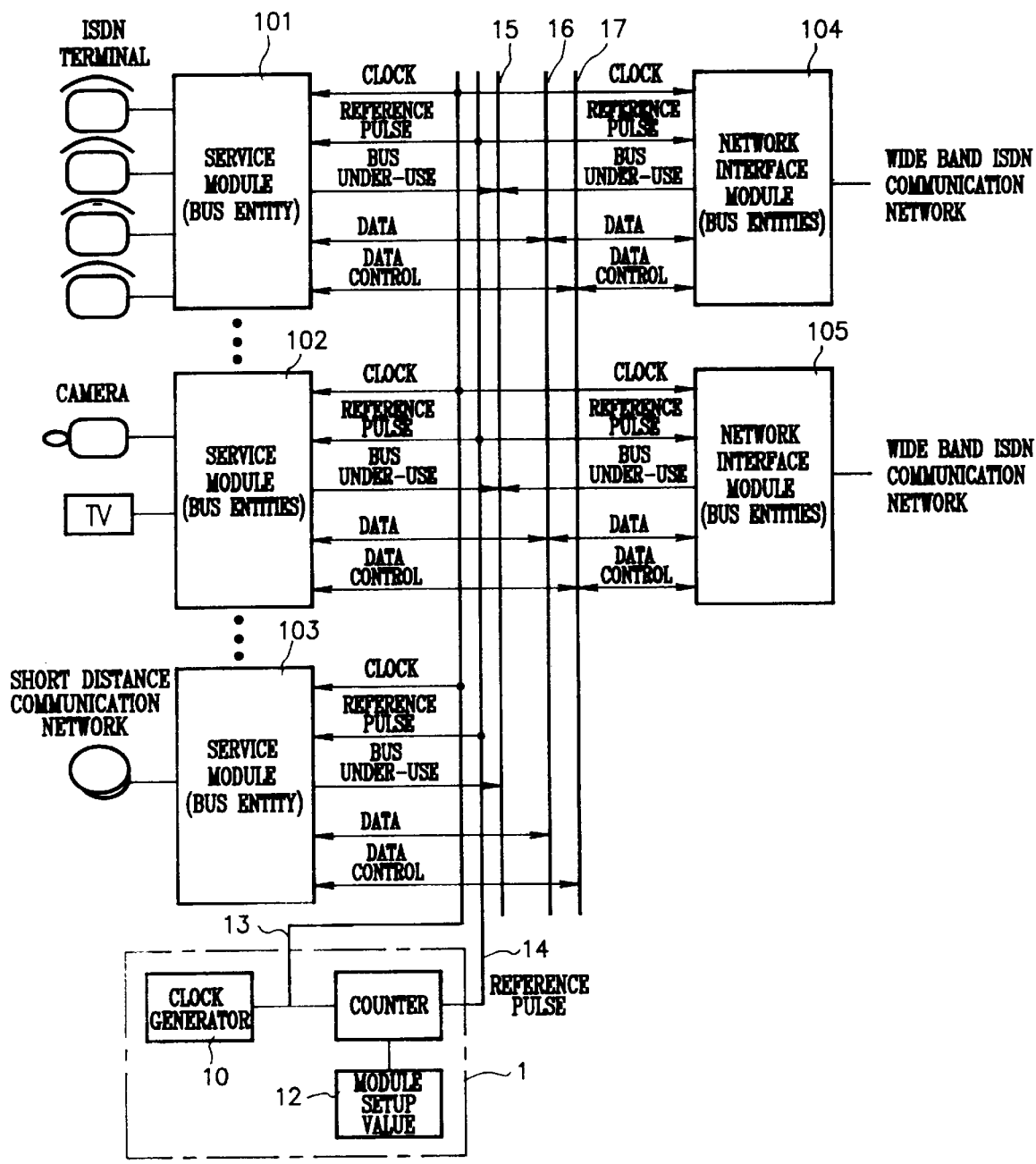
FIG. 1 illustrates an example of the application of the circuit according to the present invention.

FIG. 1 illustrates an example of the application of the circuit according to the present invention, in which a plurality of entities are connected to a sharing bus.

In the present invention, a bus arbiter is not needed, but a plurality of entities access a bus for themselves. For this purpose, there are needed 3 kinds of signals including a common clock 13, a reference pulse 14 showing the reference time point of the clock, and an under-use signal 15 which is outputted when an entity is using a bus.

The 3 kinds of signals are generated in the following manner. That is, the clock 13 is generated by a clock generator 10 which belongs to a separate clock and reference pulse generating module 1. A counter 11 generates the reference pulse 14 which has a phase same as that of the clock 13 in the overlapping interval of the counted value which is obtained by counting the output from the clock generator 10 based on a modular setup value 12.

The modular setup value 12 is decided to be as much as the total number of the entities when the entities connected to the bus judge on the bus ownership. For example, if a sharing bus is connected to an ISDN service module 101, a video service module 102, a local area network(LAN) service module 103 and two broadband ISDN communication network service modules 104 and 105, then the modular value is larger than 5, and has a value which is formed by adding the number of the priority upgrading service modules to this value. For instance, in the case where the two broadband ISDN service modules 104 and 105 have the same priority and are assigned with a priority twice over others, and the video service module 102 has the same priority, the modular value is 8.

The counter 11 counts the clocks of the clock generator 10 as much as the modular value so as to output one reference pulse 14.

The bus in-use signal 15 is generated when one entity has occupied a bus. The signal 15 is pulled up, and operates as a bidirectional signal with open drain in the respective entities.

Figure 4:
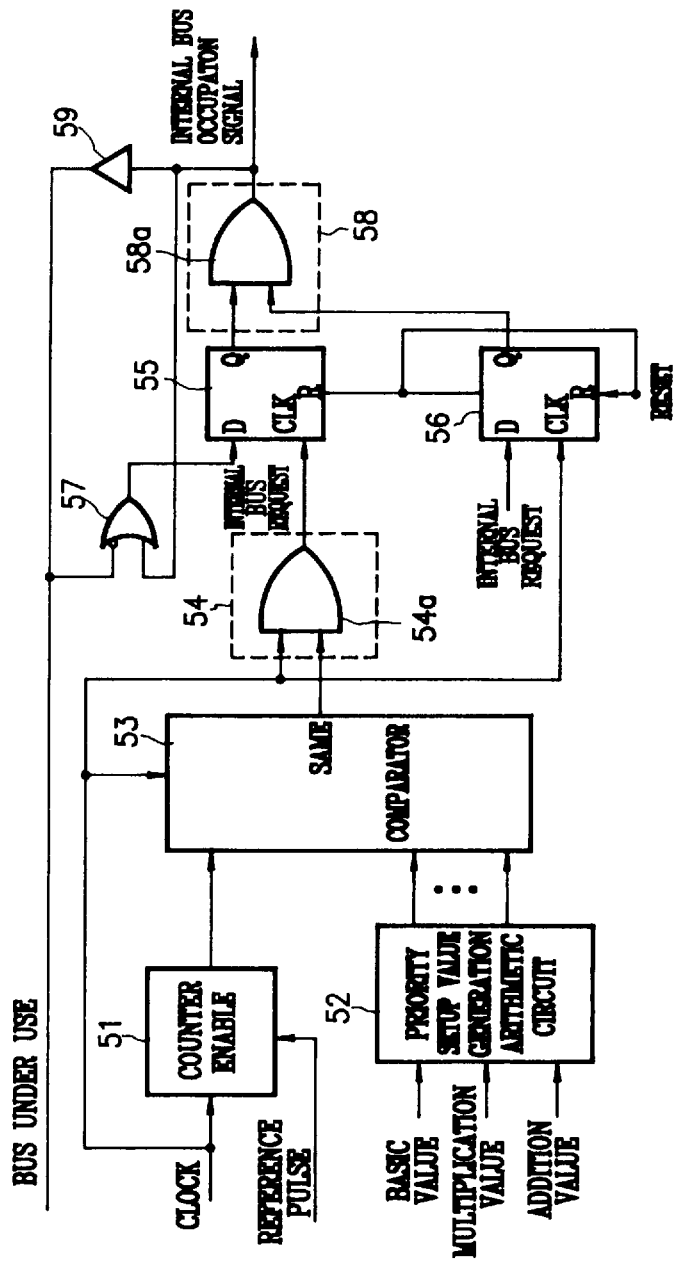
FIG. 4 illustrates the self-controlled bus arbitration circuit according to the present invention.

FIG. 4 illustrates the self-controlled bus arbitration circuit contained within the service module (entity) according to the present invention.

In describing the circuit, it is assumed for the sake of convenience that all the signals operate with positive logics and are active.

The circuit includes: a counter 51 driven by each reference pulse of the clock and reference pulse generating section 1 of FIG. 1 so as to count the number of clocks; a priority setup value generation arithmetic circuit 52 for reading addition values, multiplication values and basic values of a user so as to generate a priority setup value composed of a numeral sequence; comparator 53 for comparing an output of the counter 51 and a priority setup value of the priority setup value generating arithmetic circuit 52 so as to output a same value; a first logic multiplication section 54 for logic-multiplying the same output values and the clocks so as to generate an internally processing pulse by using an AND gate 54a; a logic summing gate 57 for generating an output upon activation of a feedback internal bus occupation or upon deactivation of a bus in-use signal; a first D flip-flop 55 for outputting an output after latching an output of the logic summing gate 57 in accordance with the generated internally processing pulse; a second D flip-flop 56 for outputting an internal bus request signal in accordance with the clock; a second logic multiplication gate 58 for generating an internal bus occupation signal based on logic-multiplying outputs of the first and second D flip-flops 55 and 56; and a buffer 59 for outputting a bus in-use signal after temporarily storing the internal bus occupation signal, for preventing conflicts of the buses.

The circuit of the present invention constituted as above will now be described as to its operations.

The counter 51 which is made to start by the reference pulse receives the clocks to increment the counted value from 0 to the inputting of the next reference pulse.

The priority setup value generation arithmetic circuit 52 reads the addition value, the multiplication value and the basic value set by the user, so as to output values corresponding to all the number sequences smaller than the maximum value of the output of the counter.

In the preferred embodiment of the present invention, the input of the priority setup value generation arithmetic circuit 52 is connected to an 8-bit dual in-line package switch and a buffer, considering the basic value, the multiplication value and the addition value.

The comparator 53 compares the output of the counter 51 with the output values of the priority setup value generation arithmetic circuit 52 by utilizing the clock signals, so as to output an internally processing pulse having a phase same as that of the clock during the time period in which the values are same. This is executed by the first AND gate 54.

This internally processing pulse is supplied to the clock input of the first D flip-flop 55. The output is supplied through the logic summing gate 57 to a D input of the first D flip-flop 55, when the internal bus occupation signal is active, or when the bus in-use signal is inactive. The output of the first D flip-flop 55 and the output of the second D flip-flop 56 which has latched the internal bus request signal by means of the clock are logic-multiplied by the second AND gate 58 so as to generate an internal bus occupation signal.

This signal is outputted in the form of a bus in-use signal through the open drain buffer 59, so that an already occupied bus is made not to be occupied by other entities, thereby preventing bus conflicts.

FIG. 5 is a flow chart showing the self-controlled bus arbitration sequence within an entity connected to a bus according to the present invention.

The bus arbitration is rendered possible by carrying out two processings simultaneously.

Figure 5A:
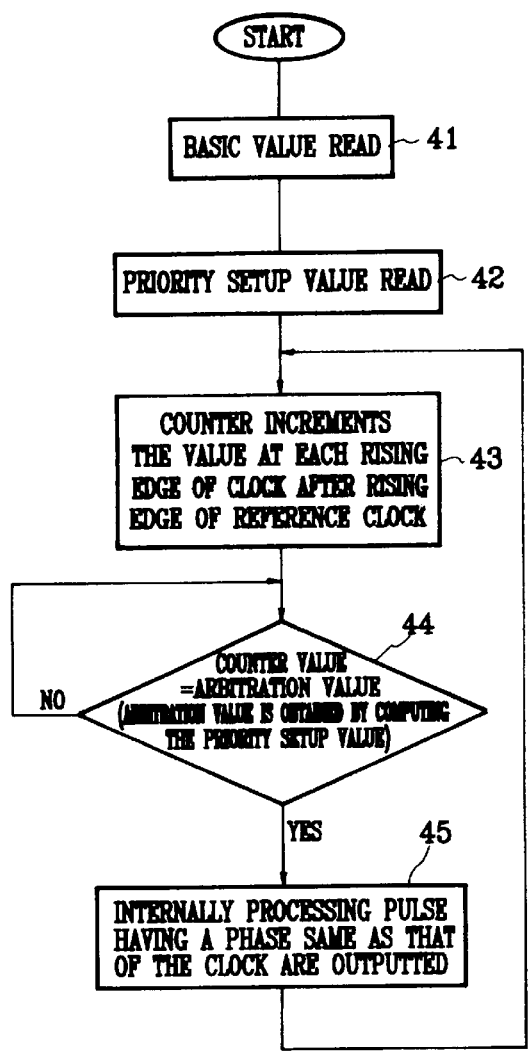
FIGS. 5A and 5B are flow charts showing the self-controlled bus arbitration method according to the present invention.

FIG. 5A is to output an internally processing pulse for carrying out the self-control type bus arbitration. The connected basic value which is connected like in the priority setup value generation arithmetic circuit 52 described above is read (41). Then the priority setup value consisting of the product and the sum which are connected like in the priority setup value generation arithmetic circuit 52 is read (42). Then the counting is incremented at each rising edge of the clocks after the rising edge of the reference pulses (43). Then a comparison is made as to whether the incremented counted value is equal to the arithmetic value of the basic value and the priority setup value (44). If the two values are equal to each other, the internally processing pulse having a phase same as that of the clock is outputted (45), and this step is repeated.

Figure 5B:
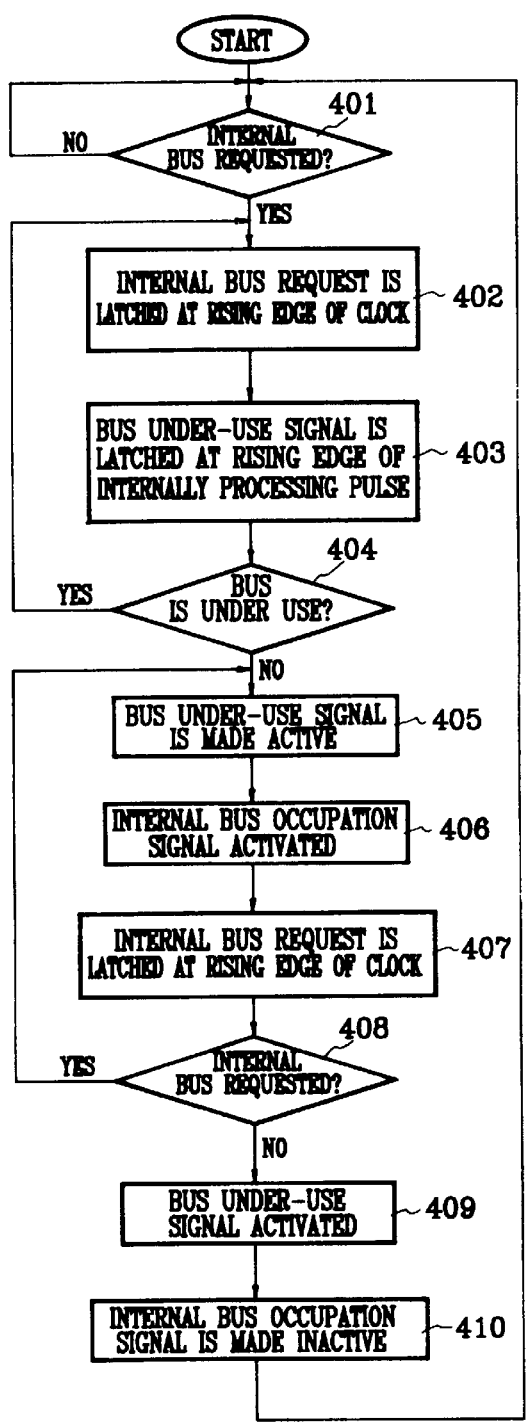

FIG. 5B process is to carry out the bus arbitration for itself by utilizing the above described three kinds of information and the internally processing pulse of the first process.

That is, an internal bus request which is generated when intending to transmit data through the bus is detected (401). If the request is an internal bus request, the request is latched at the rising edge of the clock (402). Then by using the internally processing pulse of the first process as a clock, the bus in-use signal is latched (403). Based on this latching, a judgment is made as to whether the bus is being used by another entity (404) or not.

If the bus is not occupied based on the judgment (404), the bus in-use signal is made to be active (405), and the internal bus occupation signal is made to be active (406). Thus the entity which requested the bus is let to prepare the data to transmit it to the bus.

Then the entity is made to occupy the bus, and then, the internal bus requests are continuously latched at the rising edges of the clocks. Then the termination of the internal bus request is monitored so as to check whether the internal bus use has been terminated (408). When the termination of the internal bus request is found through the monitoring, the bus in-use signal is made to be inactive (410), and the internal bus occupation signal is made to be inactive (411), thereby releasing the bus ownership.

In this context, the following fact is specially noted. It is a step 44 for checking as to whether the counter value of the first process is same as the arbitrated value. The arbitrated value refers to a setup value for setting the priority of using the bus by the entities based on a proper method. That is, in the case of an entity in which the priority has to be high, the entity is given a higher setup value compared with an entity having a low priority. In the present invention, the setup value is set by utilizing 3 kinds of values consisting of a basic value, a multiplication value and an addition value. That is, as shown in Formula 1, the setup value is based on a number sequence consisting of the basic value multiplied by the multiplication value plus the addition value. In the case where the setup value is not given a special priority, the setup value will consist of only the basic value, the multiplication value being 1, and the addition value being 0.

Setup value=basic value×multiplication value+addition value . . . (Formula 1)

where the multiplication value is an integer consisting of 1,2, . . . N, and the addition value is an integer consisting of 0,1,2, . . . ,M.

For example, if three entities are commonly connected to one bus, and if one of the entities has a priority twice those of the other two, then the basic value is 0, the multiplication value is 1, and the addition value is 2.

Figure 3:
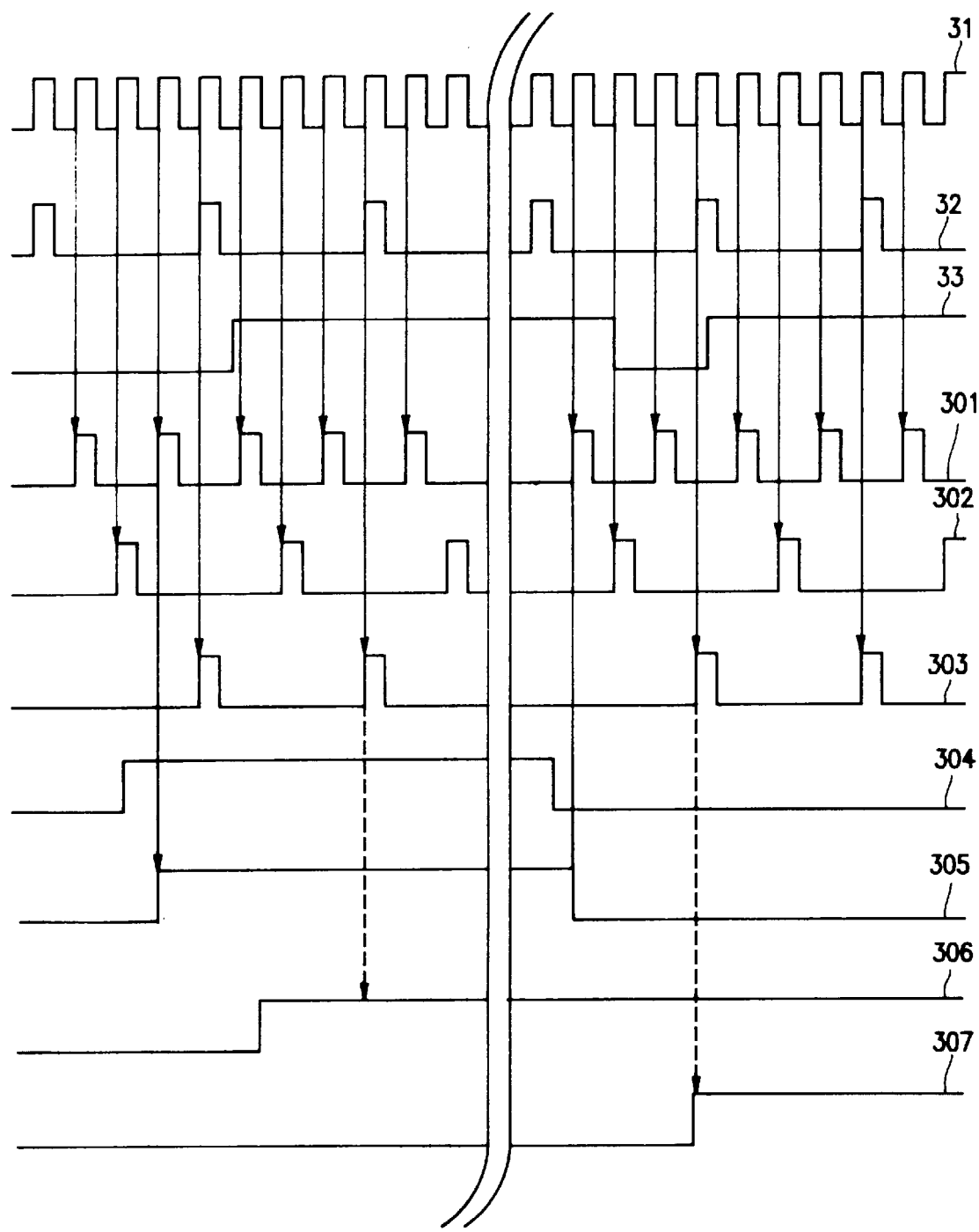
FIG. 3 illustrates a bus arbitration operation based on a priority arbitration.

For such a priority arbitration, the timings of the bus arbitration operation are illustrated in FIG. 3. The modular setup value 12 is decided as shown in FIG. 1 in such a manner that the clocks 31 are continuously supplied, and that the reference pulses 32 are supplied at time intervals which are decided by the number of the entities and the priority (in the form of clocks). In this case, the number of entities is 3, and the priority is 1. Therefore, the modular setup value is 4.

The internally processing pulse of the first entity is given the consideration that the clocks are counted starting from the rising edge of the reference pulse, and that the case of basic value 0, multiplication value=1 and addition value=2 is taken into account. Thus the internally processing pulses are outputted even in the case of 2(0×1+2). Therefore, the internally processing pulse 301 of the first entity is twice as much as the second and third entities, and therefore, it has a higher priority when the bus is not occupied. This arbitration method is based on the first-in-first-serve method. Further, when the bus is idle, the status is detected from different phases, so that bus conflict would not occur. Further, the internally processing pulses and the timing are controlled in assigning the priority.

The internal bus request signal 304 is generated when the first entity makes an internal bus request based on the internally processing pulse 301 of the first entity. This internal bus request signal 304 encounters much more bus in-use signals 33 compared with the internal bus request signals 306 of the other entities. As a result, the first entity can occupy the bus with a higher priority.

The timings of the internal bus occupations 305 and 307 of the first and third entities are illustrated in relation with the clock 31, the reference pulse 32, the bus in-use signal 33, and the internally processing pulse of the first process.

Figure 2:
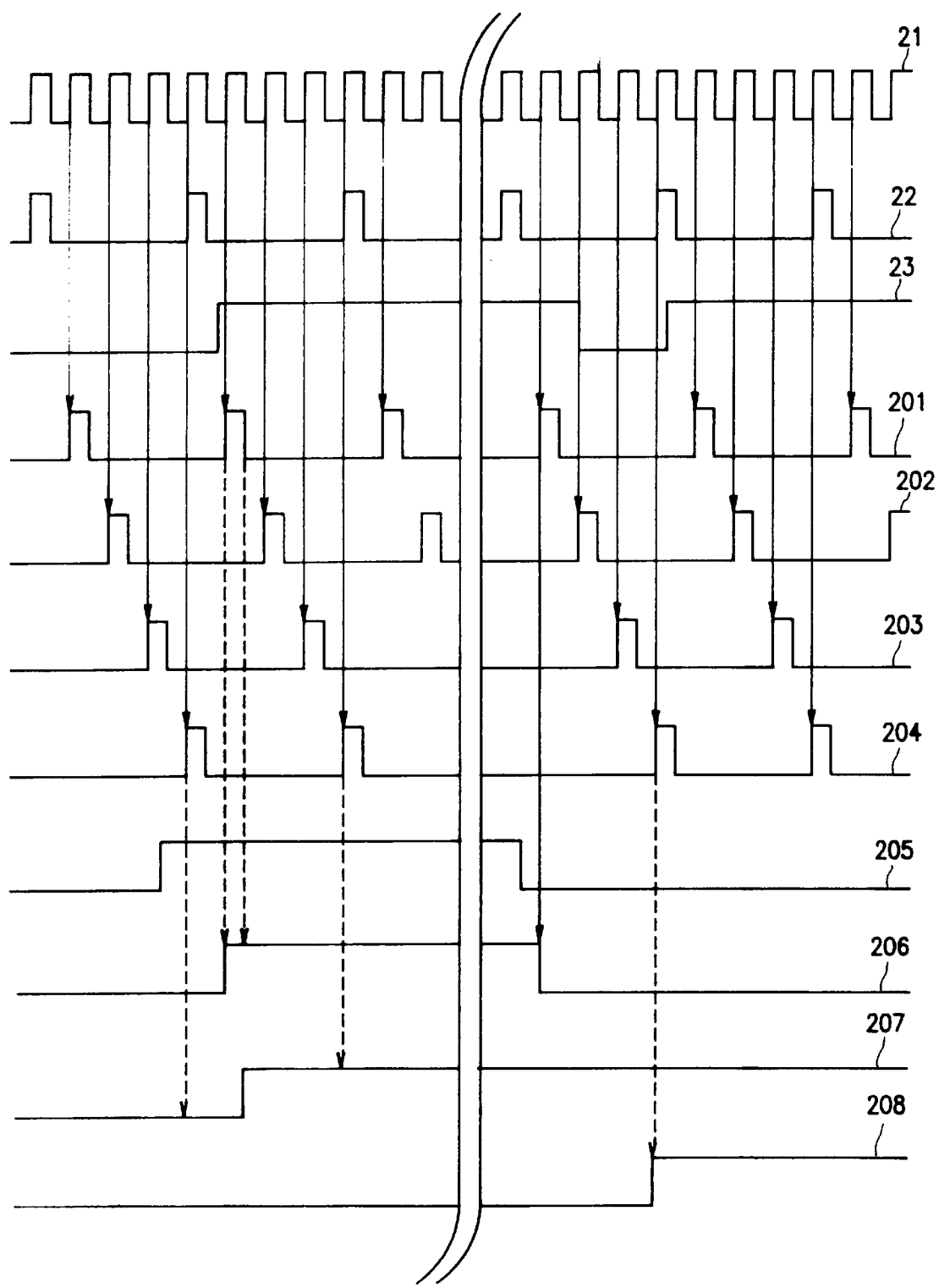
FIG. 2 illustrates the normal self-controlled bus arbitrating operation.

FIG. 2 illustrates the timings of a normal bus arbitration operation. Here the four entities have the same priority, that is, they have different basic values, a multiplication value 1, and an addition value 0.

In this case, the clock 21 and the reference pulse 22 have a common information, while the internally processing pulses 201, 202, 203 and 204 of the first, second, third and fourth entities have same intervals and same numbers in all of them. As a result, as shown in the drawing, the internal bus request signals 205 and 207 of the first and fourth entities will occupy (206 and 208) the bus with the same priority. For these bus requests, the bus in-use signals 23 are processed by the internally processing pulses of the same intervals.

According to the present invention as described above, the following effects are obtained.

First, a bus arbiter connected to the buses is not needed, and the bus ownership is arbitrated among the entities. Therefore, the entities can be designed and connected without the master-slave conception. Further, a separate signal line and procedure for the bus use request and the bus use grant are not required. Therefore, a parallel processing, in which the setup of the master-slave relation is difficult, can be applied. Further, a duplexing (or multiplexing) of the system can also be adopted, and a simplification can be realized in the constitution of the general bus. In the conventional method, the function fail of the bus arbiter leads to the function fail of the total system, but in the present invention, it is limited to the function fail of an individual entity. Therefore, the reliability of the system is improved.

Second, the bus use priority is set for each entity based on diverse combinations and permutations, and therefore, the bus ownership can be assigned in a diversified manner. Therefore, the present invention can be applied to the concentrator or a multimedia terminal unit in which various media data are processed based on a priority basis.

Third, in the conventional method, in order to request a bus ownership and to obtain a permission, a separate signal line is required, and therefore, the number of entities connectable to a bus is limited. However, in the present invention, the number of entities is not limited, but parallel connections are possible within the range of the band width. This provides a significant technical superiority in the case where the bandwidth for the entities is low, and the number of entities is large.

What is claimed is:

1. A self-control type bus arbitration circuit for transmitting data by utilizing a bus in-use signal showing in-uses of bus, a clock, and a reference pulse, comprising:
    a counting means for counting clocks simultaneously generated at each reference pulse;
    a priority setup value arithmetic means for generating priority setup values consisting of a numeral sequence including a multiplication value, an addition value and a basic value set up by a user;
    a comparing means for comparing an output of said counter and a priority setup value of said priority setup value generation arithmetic means so as to output a same value;
    an internally processing pulse outputting means for receiving the same output values and the clocks so as to generate an internally processing pulse having a phase same as that of the clock at a same time point;
    a logic means for generating an output upon activation of a feedback internal bus occupation or upon deactivation of a bus in-use signal;
    a first latching means for outputting an output after latching an output of said logic means in accordance with the generated internally processing pulse;
    a second latching means for outputting an internal bus request signal in accordance with the clock;
    an internal bus occupation signal outputting means for generating an internal bus occupation signal by receiving outputs of said first and second latching means; and
    a bus conflict preventing means for outputting a bus in-use signal after temporarily storing the internal bus occupation signal, for preventing conflicts of the buses.

2. The self-control type bus arbitration circuit as claimed in claim 1, wherein said priority setup value arithmetic means calculates a priority setup value by multiplying the basic value by the multiplication value, and by adding the addition value (where the multiplication value=integers of 1, 2, . . . ,N, and the addition value=integers of 0,1,2, . . . ,M).

3. The self-control type bus arbitration circuit as claimed in claim 1, wherein said internally processing pulse outputting means is a logic multiplication device.

4. The self-control type bus arbitration circuit as claimed in claim 1, wherein said first latching means is a D flip-flop.

5. The self-control type bus arbitration circuit as claimed in claim 1, wherein said second latching means is a D flip-flop.

6. The self-control type bus arbitration circuit as claimed in claim 1, wherein said logic means is a logic summing device having two input terminals, one of them being a negative logic.

7. The self-control type bus arbitration circuit as claimed in claim 1, wherein said internal bus occupation signal outputting means is a logic multiplication device.

8. The self-control type bus arbitration circuit as claimed in claim 1, wherein said bus conflict preventing means is an open drain type buffer.

9. A bus arbitration method comprising the steps of:
    making entities judge as to a bus ownership through self-controls by utilizing only bus in-use signals showing in-uses of sharing bus reference pulses for discriminating clocks and common clock furnished to a plurality of service modules (entities), by incrementing counting number at each the common clock upon shifting of the reference pulses and by reading one or a plurality of priority setup values during an arbitration of the bus ownership through a self-control, so as to avoid conflicts during occupation of buses by a plurality of the entities (first step);
    outputting an internally processing pulse having a phase same as that of the common clock upon equalization of the priority setup value and the counting value (second step);
    latching an internal bus request at shifting of the common clock, and latching the bus in-use signal at shifting of the internally processing pulse, to activate the bus in-use signal upon finding a non-use of a bus, and to occupy a bus ownership so as to transmit data (third step); and
    latching the internal bus request at shifting of the common clock, and activating the bus in-use signal upon termination of the internal bus request, so as to terminate the internal bus request (fourth step).

10. The bus arbitration method as claimed in claim 9, wherein, when the entities control the bus ownership for themselves, same or different priorities are controlled in accordance with pre-set priority setup values.

11. The bus arbitration method as claimed in claim 10, wherein the pre-set setup values for deciding a bus ownership priority are assigned to the entities connected to the sharing bus in such a manner as not to overlap the number of the common clock shifting between the entities, and the entity having a high priority is given a high setup value so as to raise the bus ownership priority.

12. The bus arbitration method as claimed in claim 10, wherein the pre-set setup value is formed based on a formula in which a basic value is multiplied by a multiplication value, and an addition value is added to it.

13. The bus arbitration method as claimed in claim 10, wherein, in order to reduce intervals between uses of the sharing bus, the common clock is multiplied by an integer within the entities so as to arbitrate the bus ownership.

* * * * *